May 6, 1941.     M. KLAVÍK     2,241,036
CHASSIS OF REAR-ENGINED MOTOR VEHICLES
Filed Feb. 21, 1940
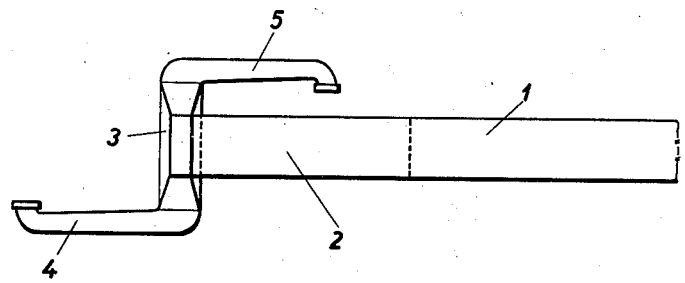
FIG. 1.
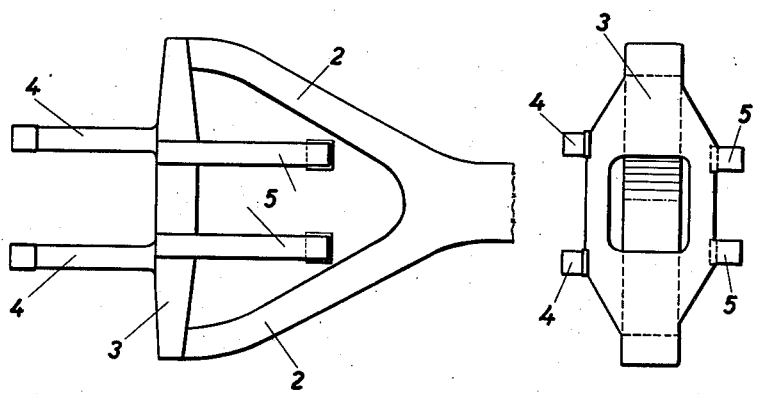 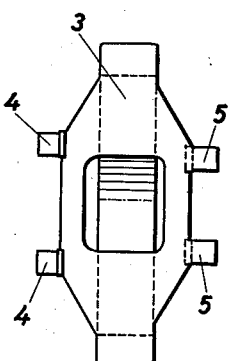
FIG. 2.     FIG. 3.
Inventor
Miloš Klavík
By Linger, Ehlert, Flournoy & Carlberg
attorneys Patented May 6, 1941

2,241,036

UNITED STATES PATENT OFFICE 2,241,036

CHASSIS OF REAR-ENGINED MOTOR VEHICLES

Miloš Klavík, Prague-Smichov, Czechoslovakia

Application February 21, 1940, Serial No. 320,196
In Czechoslovakia June 14, 1938

1 Claim. (Cl. 180—54)

The present invention relates to the chassis of rear engined motor vehicles having a main central frame or chassis member which is usually of bifurcated construction at its rear end, in which end the driving unit is advantageously suspended at three points with the use of resilient intermediate cushioning devices. However, it has become apparent that it is not always advantageous to arrange the engine as an integral part of the driving unit, which in addition to the engine includes the change speed gear and the casing for the gear which drives the axle shafts, because the engine alone may need to be dismantled from time to time for the purpose of repair and maintenance. If the engine is mounted separately from the other driving parts just mentioned, then these other parts are substantially protected against the vibrations produced by the engine.

An advantageous disposition and mounting of the driving unit is obtained according to the invention in that in the fork end of the main central chassis member there is disposed a cross carrier which is advantageously stamped from sheet metal or the like and has arms projecting therefrom and on which arms there are secured on the one hand the engine and on the other hand the casing or casings for the change speed gear mechanism and the driving gear for the axle shafts. With this arrangement, the engine and the remaining driving parts can be mounted resiliently, for instance by means of rubber intermediate layers, or if desired the engine only may be mounted resiliently and the axle driving gear and the gear box can be firmly connected with the carrier.

The invention is more particularly described with reference to the accompanying drawing which illustrates one arrangement by way of example and in which:

Figure 1 is a side elevation.
Figure 2 is a plan view and
Figure 3 is a corresponding end elevation.

A main central frame or chassis member 1 of suitable cross section terminates rearwardly in a fork 2, which is bridged by a cross carrier stamped from sheet metal. The cross member has arms 4, for supporting the engine, projecting outwardly from the carrier and arms 5, for supporting the axle shaft driving gear and the gear box, projecting in the inward direction. Resilient intermediate layers are provided between the feet of the engine and of the casing for the axle drive and the gear box on the one hand and the arms 4 and 5 of the carrier on the other hand.

I declare that what I claim is:

In a chassis for a rear engined vehicle including a main central chassis member having a fork at the rear end thereof, a cross member bridging said fork, arms extending rearwardly from the cross member for supporting the engine and arms extending forwardly from the cross member for supporting the remainder of the driving unit independently of the engine.

MILOŠ KLAVÍK.